United States Patent Office 3,435,010
Patented Mar. 25, 1969

3,435,010
CURING SYSTEM FOR HALOGEN CONTAINING ACRYLIC ELASTOMERS
Ira Starer and Arthur Clarence Lindaw, Bridgewater Township, Somerset County, N.J., assignors to American Cyanamid Company, Stamford, Conn., a corporation of Maine
No Drawing. Filed Nov. 26, 1965, Ser. No. 510,057
Int. Cl. C08f 27/06, 3/42
U.S. Cl. 260—79.5                              5 Claims

ABSTRACT OF THE DISCLOSURE

Improved acrylic elastomers are obtained by vulcanizing an active halogen-containing acrylic resin which has been compounded with between 0.5 and 5.0% each of (a) a thiuram-type sulfur-donor represented by the formula:

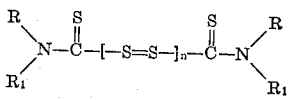

wherein $n$ is a whole integer equal to one or two and the R's are individually selected from the group consisting of lower alkyl, monocarbocyclic aryl, monocarbocyclic ar(lower alkyl), or may together with the nitrogen of the thiuram form a heterocyclic ring; (b) a substituted guanidine of the formula:

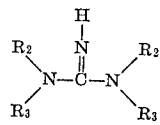

wherein the R's are individually selected from the group consisting of hydrogen, monocarbocyclic aryl or monocyclic ar(lower alkyl), at least one R on each nitrogen of the guanidine being other than hydrogen.

---

This invention relates to an improved process for vulcanization of acrylic elastomers containing active halogen. More particularly, it relates to a process for vulcanizing said elastomers with a combination of thiuram-type sulfur-donors and substituted guanidines; and to the vulcanizates thus produced.

The thiuram-type sulfur donors are characterized by the formula:

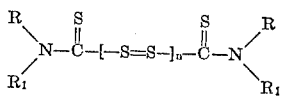

wherein $n$ is a whole integer equal to one or two and the R's are lower alkyl ($C_1$–$C_7$), monocarbocyclic aryl or monocarbocyclic ar(lower alkyl) or may together with the nitrogen form a saturated heterocyclic ring such as a piperidine, piperazine or morpholine ring.

The substituted guanidines are characterized by the formula:

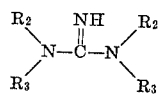

wherein the R's are individually hydrogen, monocarbocyclic aryl or monocarbocyclic ar(lower alkyl), at least one R on each nitrogen of the guanidine nucleus being other than hydrogen.

Acrylic elastomers containing active halogen are normally copolymers or terpolymers of a major proportion of lower alkyl acrylate and a minor proportion of a monomer containing an active halogen, such as 2-chloro- ethyl vinyl ether, vinyl chloroacetate, 2-chloroethyl acrylate, etc. The commercially available acrylic elastomers containing active halogens include copolymers of ethyl acrylate and about 5% of 2-chloroethyl vinyl ether; copolymers of ethyl acrylate and about 5% of 2-chloroethyl acrylate; and copolymers of 70% or more of ethyl acrylate of up to 15% of vinyl chloroacetate.

Various agents have been used or suggested for the curing of acrylic elastomers containing active halogen. Among the curing agents which have been suggested are ammonia and various primary and secondary amines. Unfortunately, for most purposes, amines are too fast reacting as curing agents for many purposes. Particularly this is true of the new elastomeric copolymers of ethyl acrylate and vinyl chloroacetate.

Improved curing systems for halogen-containing acrylic elastomers involving the use of ammonium salts, ammonium salts plus alkyl halides, ammonium salts plus alkaline earth metal oxides, and sulfur plus alkali metal salts of carboxylic acids, are also known. These curing systems offer certain advantages over former systems but generally do not fulfill all the requirements of the ideal curing system. Thus, the need for improved curing systems for halogen-containing acrylic elastomers continues to exist.

It has now been discovered that a curing system comprising sulfur-donors of Formula I in combination with substituted guanidines of Formula II offers advantages over previously known curing systems. This result is surprising in view of the fact that neither component when used alone is a satisfactory curing agent. An additional surprising feature is the fact that combinations of substituted guanidines and sulfur or sulfur-donors of other structures are not satisfactory curing sytsems.

Among the advantages that are obtained by the present invention are improved resistance of compounded stocks to the effects of water or moisture and improved thermal stability of vulcanizates. In addition, the present invention provides stocks that have good processing characteristics and are unchanged in cure rate as a result of changes in climatic conditions.

An important use for halogen-containing acrylic elastomers is in making oil-resistant molded products, such as O-rings, oil seals, gaskets, etc. It is therefore important that the cured products have heat resistance as well and that such products can be reproduced at various times of the year from compounded stocks stored or utilized under varying climatic conditions.

The curing process of this invention is particularly valuable for curing copolymers of ethyl acrylate and vinyl chloroacetate, e.g., a copolymer containing about 2% of combined vinyl chloroacetate. It is also useful for curing terpolymers such as one derived from 70% ethyl acrylate, 15% vinyl chloroacetate and 15% b-cyanoethylacrylate; or 70% butyl acrylate, 15% vinyl chloroacetate and 15% b-cyanoethylacrylate; or 70% ethyl acrylate, 15% vinyl chloroacetate and 15% acrylonitrile; or etc.

The process comprises mixing the elastomer with a sulfur-donor of Formula I, a guanidine of Formula II, and other conventional additives. The compounding can be done on a rubber mill by standard procedures. The compounded rubber is then cured at an elevated temperature, as in a heated mold. Post-curing may then be applied to develop fully the desired properties of the cured elastomer.

The sulfur-donor is of the thiuram type and includes such compounds as bis(dimethylthiocarbamyl)disulfide,
bis(diethylthiocarbamyl)disulfide,
bis(dibutylthiocarbamyl)disulfide,
bis(piperidinothiocarbonyl)sulfide, bis(dibenzylthiocarbamyl)disulfide,
bis(diphenylthiocarbamoyl)disulfide,
bis(piperidinothiocarbamyl)tetrasulfide,
bis(ethylmethylthiocarbamyl)disulfide, etc. The sulfur-donor is used in the amount of between 0.5 and 5.0%, preferably between 1.0 and 4.0%, based on the weight of the elastomer. The amount of sulfur-donor employed will be influenced to some extent by the available sulfur concentration of the sulfur-donor employed. Thus, the amount of sulfur-donor employed should be such as to furnish between 0.06 and 0.75% sulfur, preferably between 0.125 and 0.5% sulfur, based on the weight of the elastomer.

The substituted guanidines that may be employed in this invention include such compounds as dibutylguanidine, dioctylguanidine, didodecylguanidine, diphenylguanidine, dibenzylguanidine, di-ortho-toiylguandine, di-meta-tolylguanidine, di-para-tolylguanidine, dixylylguanidine, etc. It is preferred to employ substituted guanidines of low basicity so as to obtain reasonable scorch rates and cure cycles If it is desired, they may be used in combination with substituted guanidines of high basicity to flexibilize cure cycles. The substituted guanidine is used in an amount of between 0.5 and 5.0%, preferably between 1.0 and 4.0%, based on the weight of the elastomer. Where combinations are employed, the total amount of substituted guanidines employed should fall in the ranges given above.

Additives normally used in the compounding of elastomers may be added as usual. These additives include carbon black and other fillers and pigments, antioxidants, stabilizers, etc.

The compounded elastomers are vulcanized by standard procedures. Curing temperatures above 150° C. are recommended. Post-curing is generally desirable to fully develop the properties of the cured elastomer, and is generally for a period of 4 to 24 hours, preferably 8 to 16 hours, at 150° C. or higher.

The invention is more fully illustrated by the following examples in which parts and percentages are on a weight basis unless otherwise indicated.

Example 1

Five batches of a 97.5/2.5 ethyl acrylate/vinyl chloroacetate elastomer were compounded according to the formulations shown in Table I.

The Mooney scorch rates are shown as $t_5$ and $t_{30}$ values. The $t_5$ value represents the time required for a 5-point increase in the Mooney viscosity from the minimum viscosity at the temperature of measurement, in this case 329° F. The $t_{30}$ value represents the additional time required for a 35-point increase in the Mooney viscosity under the same conditions. It is obtained determining the time required for a 35-point increase in the Mooney viscosity at the temperature employed and subtracting from this time ($t_{35}$) the time determined for $t_5$. Thus, $$t_{30} = t_{35} - t_5$$

TABLE I

| | Parts | | | | |
|---|---|---|---|---|---|
| | A | B | C | D | E |
| Elastomer | 100 | 100 | 100 | 100 | 100 |
| Stearic Acid | 2 | 2 | 2 | 2 | 2 |
| Carbon Black [1] | 60 | 60 | 60 | 60 | 60 |
| Phenyl-beta-naphthylamine | 2 | 2 | 2 | 2 | 2 |
| Di-ortho-tolylguanidine | 2 | 2 | 2 | | 2 |
| Bis(dimethylthiocarbamyl)disulfide | | 1 | | | |
| Bis(piperidinothiocarbonyl)tetrasulfide | | | 1 | | |
| 4,4'-dithiodimorpholine | | | | 1 | |
| Mooney Scorch Rate, Minutes | | | | | |
| $t_5$ | 1.5 | 1.7 | 1.7 | 5.2 | 5.1 |
| $t_{30}$ | 3.1 | 1.7 | 0.7 | 4.8 | 7.7 |

[1] Fast Extruding Furnace Carbon Black.

The Mooney scorch rate times indicate that formulations A, D and E could not be cured under practical conditions. Thus, the substituted guanidine and the thiuram type sulfur-donor when employed alone do not produce a satisfactory cure. Also, sulfur-donors of other compound types when used in combination with substituted guanidines do not produce a satisfactory cure.

Samples of the compounded elastomers B and C were then vulcanized by heating at 165° C. for the length of time shown in Table II. The physical properties of the vulcanized elastomers are shown in Table II, along with data obtained after post-curing for 16 hours at 150° C. These data show the effectiveness of the curing system and the benefits of post-curing.

TABLE II

| | B | | C | |
|---|---|---|---|---|
| | Original Cure | Post Cure | Original Cure | Post Cure |
| Minutes of Cure | 15 | | 10 | |
| 100% Modulus (lb./in.²) | 305 | 1,555 | 415 | 565 |
| 200% Modulus (lb./in.²) | 945 | | 865 | 1,210 |
| Tensile Strength (lb./in.²) | 1,440 | 2,105 | 1,365 | 1,535 |
| Elongation (percent) | 395 | 155 | 425 | 330 |
| Hardness (Shore A) | | 82 | 71 | 79 |

Example 2

Seven batches of a 97.5/2.5 ethyl acrylate/vinyl chloroacetate elastomer were compounded as formulation B of Example 1, except for the relative amounts of bis(dimethylthiocarbamyl)disulfide (BDMTCD) and of di-ortho-tolyl guanidine (DOTG). The formulation variations are shown in Table III along with Mooney scorch rates and physical properties after curing 15 minutes at 165° C. and after post-curing 16 hours at 150° C.

This experiment shows the range of concentrations of the sulfur-donor and substituted guanidine that can be employed and indicates that the best balance between scorch rates and physical properties is that exhibited by formulations F and K.

TABLE III

| | Parts | | | | | | |
|---|---|---|---|---|---|---|---|
| | F | G | H | I | J | K | L |
| Formulation: | | | | | | | |
| BDMTCD | 2 | 2 | 4 | 1 | 1 | 4 | 4 |
| DOTG | 2 | 4 | 4 | 4 | 2 | 2 | 1 |
| Mooney Scorch Rate, Minutes: | | | | | | | |
| $t_5$ | 1.7 | 1.7 | 1.6 | 1.6 | 1.9 | 1.8 | 2.1 |
| $t_{30}$ | 1.2 | 1.3 | 1.3 | 1.1 | 1.3 | 1.2 | 1.2 |
| Physical Properties: Cure 15 min. at 165° C.: | | | | | | | |
| 100% Modulus (lb./in.²) | 385 | 305 | 425 | 358 | 485 | 555 | 680 |
| 200% Modulus (lb./in.²) | 945 | 835 | 890 | 765 | 1,005 | 1,170 | 1,320 |
| Tensile Strength (lb./in.²) | 1,440 | 1,390 | 1,280 | 1,235 | 1,325 | 1,445 | 1,470 |
| Elongation (percent) | 395 | 445 | 440 | 485 | 410 | 350 | 297 |
| Hardness (Shore) | 66 | 68 | 67 | 69 | 70 | 70 | 70 |
| Physical Properties: Post-Cure 16 hours at 150° C.: | | | | | | | |
| 100% Modulus (lb./in.²) | 1,555 | 1,015 | 865 | 705 | 1,055 | 1,490 | 1,840 |
| 200% Modulus (lb./in.²) | | 1,755 | 1,585 | 1,435 | 1,810 | | |
| Tensile Strength (lb./in.²) | 2,105 | 1,790 | 1,625 | 1,595 | 1,830 | 1,935 | 2,100 |
| Elongation (Percent) | 155 | 225 | 240 | 275 | 205 | 150 | 110 |
| Hardness (Shore A) | 82 | 80 | 79 | 79 | 80 | 79 | 82 |

Example 3

The formulations of a 97.5/2.5 ethyl acrylate/vinyl chloroacetate elastomer were compounded as formulation F of Example 2 except that in one, formulation M, the phenyl-beta-naphthylamine was omitted. The Mooney scorch rates were determined as $t_5$ at 250° F.

The compounded elastomers were then vulcanized by heating for 10 minutes at 330° F. Post-curing was for 8 hours, at 350° F. Physical properties are given as before in Table IV. Additionally, heat stability data on these vulcanizates are also given in Table IV.

This example shows that the presence of an anti-oxidant in the compounded elastomer has little effect on the properties of the vulcanizate. It also shows that the vulcanizates obtained with the curing system of this invention have outstanding heat stability under various conditions of testing.

TABLE IV

[Mooney scorch rates: $t_5$ at 250° F. (min.); F=7.2; M=7.3]

| Physical Properties | Cured 10 Min. at 330° F. | | Post-Cured 8 Hrs. at 350° F. | |
|---|---|---|---|---|
| | F | M | F | M |
| 100% Modulus (lb./in.²) | 330 | 315 | 1,260 | 1,455 |
| Tensile Strength (lb./in.²) | 1,525 | 1,505 | 1,805 | 2,105 |
| Elongation (percent) | 415 | 430 | 140 | 155 |
| Hardness (Shore) | 65 | 66 | 80 | 79 |

| Heat Stability, Aging Conditions | Percent Change In— | | | | | | | |
|---|---|---|---|---|---|---|---|---|
| | Tensile Strength | | Elongation | | Hardness | | Volume | |
| | F | M | F | M | F | M | F | M |
| Air, Forced Draft Oven: | | | | | | | | |
| 70 Hrs. 300° F | +15 | 0 | −21 | −41 | +4 | +3 | | |
| 70 Hrs. 350° F | +7 | −3 | −31 | −31 | +6 | +5 | | |
| 70 Hrs. 400° F | −51 | −74 | −14 | −68 | +8 | +8 | | |
| Cell Oven: | | | | | | | | |
| 70 Hrs. 300° F | +10 | −4 | 0 | −17 | +1 | +1 | | |
| 70 Hrs. 350° F | −3 | −15 | −18 | −20 | +2 | +3 | | |
| Fluid: | | | | | | | | |
| ASTM Oil No. 1, 70 Hrs. 300° F | +6 | 0 | −23 | −31 | +1 | +2 | −0.9 | −0.3 |
| ASTM Oil No. 2, 70 Hrs. 300° F | −9 | −20 | 0 | −25 | −6 | +5 | +10.9 | +12.4 |
| Compression Set Method B, 70 Hrs. 300° F | 41 | 44 | | | | | | |

We claim:

1. A vulcanizable elastomeric composition comprising (1) an active halogen-containing acrylic elastomer, and (2) between 0.5 and 5.0% each of (a) a thiuram type sulfur-donor represented by the formula:

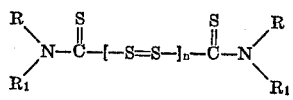

wherein $n$ is a whole integer equal to one or two and the R's are individually selected from the group consisting of lower alkyl, monocarbocyclic aryl, monocarbocyclic ar(lower alkyl), or may together with the nitrogen of the thiuram form a heterocyclic ring; and (b) a substituted guanidine of the formula:

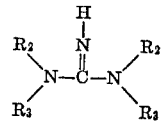

wherein the R's are individually selected from the group consisting of hydrogen, monocarbocyclic aryl or monocyclic ar(lower alkyl), at least one R on each nitrogen of the guanidine being other than hydrogen.

2. The composition of claim 1 wherein the active halogen-containing acrylic elastomer is a copolymer of ethyl acrylate and vinyl chloroacetate.

3. The composition of claim 1 wherein the sulfur-donor is bis(N,N-dimethylthiocarbamoyl)disulfide.

4. The composition of claim 1 wherein the sulfur-donor is used at a concentration such as to supply between 0.06 and 0.75% sulfur based on the weight of the elastomer.

5. The composition of claim 1 wherein the substituted guanidine is di-ortho-tolylguanidine.

References Cited

UNITED STATES PATENTS

| 2,600,414 | 6/1952 | Mast et al. | 260—79.5 |
| 3,337,492 | 8/1967 | Waldron et al. | 260—79.5 |
| 3,324,088 | 6/1967 | Waldron | 260—79.5 |

JAMES A. SEIDLECK, *Primary Examiner.*

U.S. Cl. X.R.

260—41, 23, 45.9